United States Patent [19]
Nishioka et al.

[11] 4,387,969
[45] Jun. 14, 1983

[54] SINGLE-LENS REFLEX OPTICAL SYSTEM FOR ENDOSCOPES

[75] Inventors: Kimihiko Nishioka; Nobuo Yamasita, both of Hachiouji, Japan

[73] Assignee: Olympus Optical Co., Ltd., Tokyo, Japan

[21] Appl. No.: 222,874

[22] Filed: Jan. 6, 1981

[30] Foreign Application Priority Data

Jan. 7, 1980 [JP] Japan ......................... 55-429

[51] Int. Cl.³ ............................................. G02B 5/17
[52] U.S. Cl. .................. 350/462; 350/96.26; 350/445
[58] Field of Search ............. 350/415, 445, 447, 469, 350/474, 173, 96.26

[56] References Cited

U.S. PATENT DOCUMENTS

| | | | |
|---|---|---|---|
| 3,918,072 | 11/1975 | Imai et al. | 350/96.26 |
| 4,025,155 | 5/1977 | Imai | 350/447 |
| 4,113,354 | 9/1978 | Yamasita et al. | |

*Primary Examiner*—John K. Corbin
*Assistant Examiner*—P. Dzierzynski
*Attorney, Agent, or Firm*—Cushman, Darby & Cushman

[57] ABSTRACT

A single-lens reflex optical system for endoscopes comprising an observing optical system, a light-splitting means and a photographing optical system, the observing optical system comprising a diverging front lens group arranged on a first optical axis extending in parallel with the longitudinal direction of an endoscope and having negative refractive power, a positive lens group arranged on the first optical axis, and a first converging rear lens group arranged on the first optical axis and having positive refractive power, the light-splitting means arranged between the positive lens group and first converging rear lens group, the photographing optical system comprising the diverging front lens group, the positive lens group, and a second converging rear lens group arranged on a second optical axis deflected by the light-splitting means and having positive refractive power, the single-lens reflex optical system enabling to make diameters of lenses small and, consequently, enabling to make the diameter of distal end of endoscope small.

4 Claims, 5 Drawing Figures

SINGLE-LENS REFLEX OPTICAL SYSTEM FOR ENDOSCOPES

BACKGROUND OF THE INVENTION (a) Field of the Invention

The present invention relates to a single-lens reflex optical system for endoscopes.

(b) Description of the Prior Art

To observe the inside of tubular members such as a rectum, esophagus, etc., a forward-viewing type endoscope is used. This is due to the following reason. If a side-viewing type endoscope is used for observation of a tubular member, the object to be observed or photographed (the inner wall of the esophagus or the like) comes into close contact with the cover glass arranged at the front of the objective of the endoscope and, consequently, it becomes impossible to observe or photograph the object with an adequate magnification and field.

FIG. 1 shows an example of known single-lens reflex optical systems to be used in a forward-viewing type endoscope, which is used for observation of a tubular member and which is arranged so that a film cassette can be loaded. The optical system shown in FIG. 1 comprises a photographing optical system and an observing optical system, the photographing optical system comprising lens components 2, 6 and 7 arranged on the optical axis 1 which extends in parallel with the longitudinal direction of the endoscope, the observing optical system comprising lens components 2, 3 and 4, the lens components 3 and 4 being arranged on the optical axis 1' which is split by a light-splitting prism 9 and directed to an optical fiber bundle 5. In case of the above-mentioned optical system, a film surface 8 is arranged perpendicular to the optical axis 1. Therefore, the film cassette should be loaded in the direction perpendicular to the longitudinal direction of the endoscope. As, however, the film cassette is very long compared with the diameters of lens components, the diameter of the distal end of the endoscope becomes large when the film cassette is arranged in the direction perpendicular to the longitudinal direction of the endoscope.

As a method to eliminate the above-mentioned disadvantage, it may be considered to arrange the film cassette in the direction parallel with the longitudinal direction of the endoscope. FIG. 2 shows an optical system in which the above-mentioned idea is adopted. The optical system shown in FIG. 2 comprises an observing optical system and a photographing optical system, the observing optical system comprising a diverging front lens group 11 and a first converging rear lens group 12 which are arranged on the optical axis 10, the photographing optical system comprising the diverging front lens group 11 and a second converging rear lens group 14, the second converging rear lens group 14 being arranged on the optical axis 10' which is split by a light-splitting prism 13.

In case of the optical system shown in FIG. 2, the space in the diametral direction in the distal end of the endoscope which is occupied by the film cassette 15 becomes very small compared with the case of the optical system shown in FIG. 1. However, in case of a retrofocus-type optical system for endoscopes as shown in FIG. 2, the airspace between the diverging front lens group and each of the converging rear lens groups becomes large when the film cassette is arranged in the longitudinal direction of the endoscope. In case of a retrofocus-type optical system, paraxial rays are diverged by the diverging front lens group and, consequently, the height of the paraxial marginal ray which enters the converging rear lens group becomes larger when the airspace between the front and rear lens groups becomes larger. Therefore, when the airspace between the diverging front lens group and converging rear lens group becomes larger, diameters of lenses in the converging rear lens group should be made larger. Besides, in order to let the offaxial ray enter the coverging rear lens group at a pre-determined angle, the height of the offaxial ray which enters the diverging front lens group should be made larger when the airspace between the diverging front lens group and converging rear lens group becomes larger. Consequently, it becomes necessary to make the diameter of the lens constituting the diverging front lens group larger. As explained in the above, when the airspace between the diverging front lens group and converging rear lens group becomes large due to the fact that the film cassette 15 is arranged in the longitudinal direction of the endoscope, diameters of lenses in both of the diverging front lens group and converging rear lens group become large. In other words, in spite of the fact that the space in the distal end of the endoscope occupied by the film cassette 15 becomes smaller, diameter of lenses become larger and, consequently, the diameter of the distal end of the endoscope becomes larger also in case of the optical system shown in FIG. 2.

SUMMARY OF THE INVENTION

It is, therefore, a primary object of the present invention to provide a single-lens reflex optical system for endoscopes which is arranged so that a film cassette can be loaded in the direction parallel with the longitudinal direction of the endoscope and, at the same time, arranged so that diameters of lenses constituting the optical system will not become large by arranging a positive lens group between a diverging front lens group and converging rear lens group.

Another object of the present invention is to provide a single-lens reflex optical system for endoscopes comprising an observing optical system and a photographing optical system, said observing optical system comprising a diverging front lens group, a positive lens group, and a first converging rear lens group, said photographing lens group comprising said diverging front lens group, said positive lens group, and a second converging rear lens group, said second converging rear lens group being arranged on an optical axis which is deflected by a light-splitting means, said single-lens reflex optical system for endoscopes satisfying the following conditions:

$$\frac{1}{f_1} \leq \frac{1}{\frac{1}{\frac{1}{t_2} - \frac{1}{f_2}} + A - t_2} - \frac{1}{f} \quad (I)$$

$$f_2 \leq A - t_2 - f_1 \quad (II)$$

$$\frac{k}{F \tan \omega}\left(1 + \frac{A - t_2}{-f_1}\right) \leq 1 \quad (III)$$

wherein reference symbol f represents the focal length of the photographing optical system, reference symbol $f_1$ represents the focal length of the diverging front lens group, reference symbol $f_2$ represents the focal length of the positive lens group, reference symbol A represents the distance between the diverging front lens group and aperture stop of the photographing optical system, reference symbol $t_2$ represents the distance between the positive lens group and said aperture stop, reference symbol F represents the F-number of the photographing optical system, reference symbol $\omega$ represents a half filed angle of the photographing optical system, and reference symbol k represents the ratio between the height of marginal ray in the photographing optical system at the front of the light-splitting means and the height of marginal ray in the observing optical system at the front of the light-splitting means.

DETAILED DESCRIPTION OF THE PREFERRED EMBODIMENT

Figure 1:
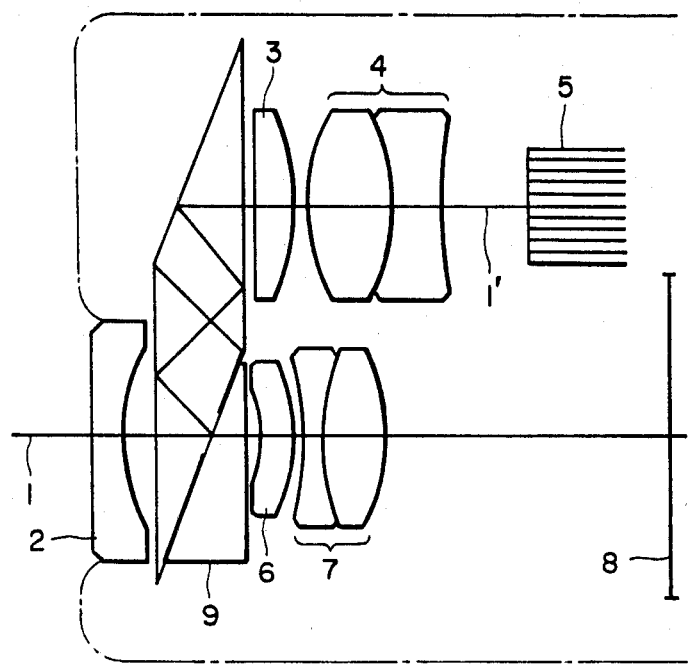
FIG. 1 shows a schematic view of a known single-lens reflex optical system for a forward-viewing endoscope.
Figure 2:
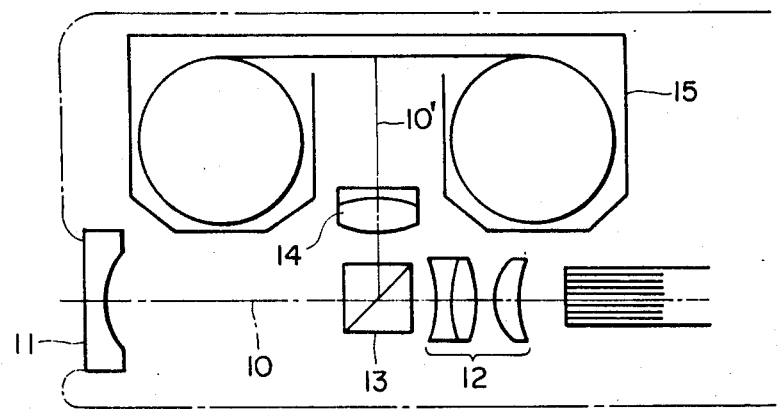
FIG. 2 shows a schematic view of a single-lens reflex optical system wherein a film cassette is arranged in the distal end of an endoscope so that the film cassette is located in parallel with the longitudinal direction of the endoscope.
Figure 3:
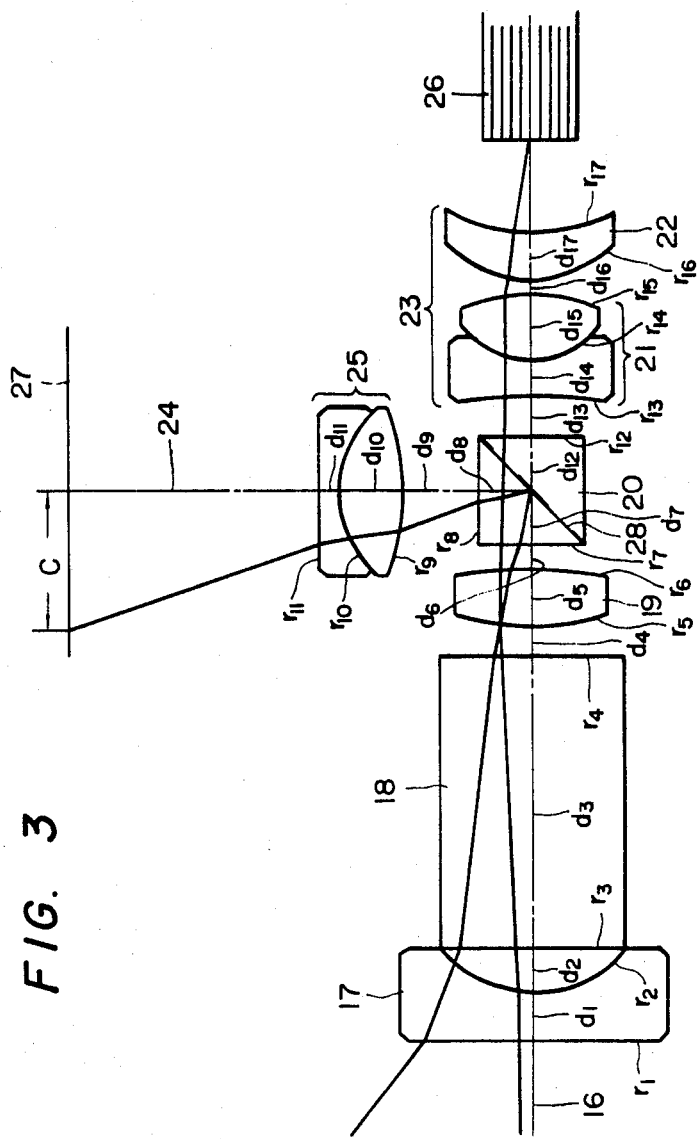
FIG. 3 shows a sectional view of an embodiment of the single-lens reflex optical system for endoscopes according to the present invention.

FIG. 3 shows an embodiment of the single-lens reflex optical system for endoscopes according to the present invention. In this figure, numeral 17 designates a diverging front lens group comprising a negative lens which serves also as a cover glass, numeral 18 designates a glass block with parallel plane surfaces, and numeral 19 designates a positive lens group (biconvex single lens). The positive lens group 19 is so arranged that the absolute value of the radius of curvature of its surface on the object side is smaller than the absolute value of the radius of curvature of its surface on the image side. Numeral 20 designates a light-splitting prism, numeral 23 designates a first converging rear lens group comprising a cemented doublet 21, which consists of a negative lens and positive lens, and a positive lens 22. The diverging front lens group 17, glass block 18, positive lens group 19, light-splitting prism 20 and the first converging rear lens group 23 are respectively arranged on a first optical axis 16, which extends in parallel with the longitudinal direction of an endoscope, and constitute an observing optical system. Numeral 25 designates a second converging rear lens group arranged on a second optical axis 24, which is deflected by the light-splitting prism 20, and comprising a cemented doublet consisting of a positive lens and negative lens. The diverging front lens group 17, glass block 18, positive lens group 19, light-splitting prism 20 and the second converging rear lens group 25 constitute a photographing optical system. The above-mentioned observing optical system forms an image of an object, which is not shown, onto an image-transmitting optical fiber bundle 26 while the above-mentioned photographing optical system forms an image of the object onto a film surface 27.

Figure 4:
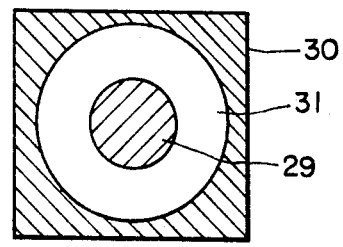
FIG. 4 shows a front view of a light-splitting surface of a light-splitting prism used in said embodiment.

FIG. 4 shows a front view of a light-splitting surface 28 of the light-splitting prism 20. As shown in this figure, the surface 28 is composed of a central portion 29, intermediate portion 31 and outer portion 30, the central portion 29 being a circular reflecting surface, the intermediate portion 31 being an annular transparent portion, the outer portion 30 being a light shielding surface. Therefore, a portion of light which enters the light-splitting prism 20 is reflected by the central portion 29 and reaches the film surface 27 passing through the second converging rear lens group 25. The remainder of light which enters the prism 20 passes through the intermediate portion 31 and reaches the end face of the optical fiber bundle 26 passing through the first converging rear lens group 23. In other words, the central portion 29 of the surface 28 serves as the aperture stop for the photographing optical system while the intermediate portion 31 serves as the aperture stop for the observing optical system.

The optical system according to the embodiment described in the above enables it to attain the object of the present invention. However, it is possible to provide a more favourable optical system by arranging so that the above-mentioned optical system satisfies the aforementioned conditions. This is described below based on the paraxial theory assuming that each of lens groups constituting the optical system is a thin lens.

Figure 5:
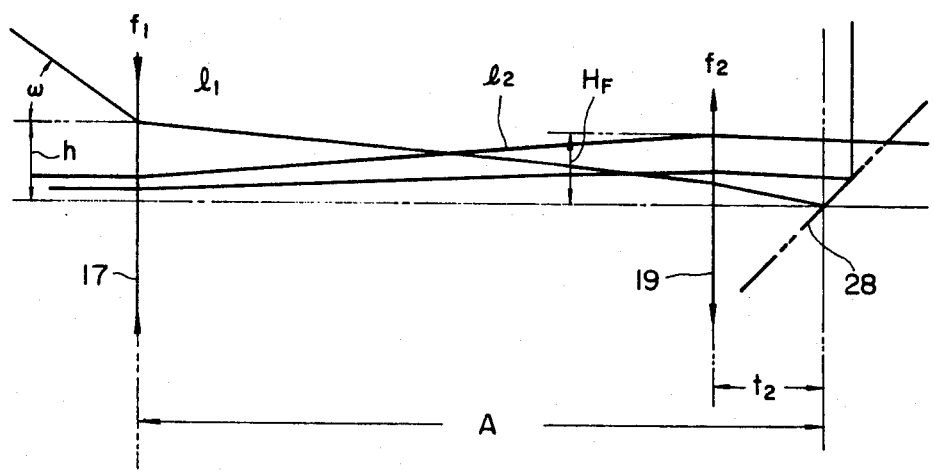
FIG. 5 shows a diagrammatic illustration for explaining the theory of the present invention.

FIG. 5 shows a diagrammatic illustration of the portion on the object side of the light splitting surface 28, i.e., stop surface of the photographing optical system, of the signle-lens reflex optical system according to the embodiment shown in FIG. 3. In this figure, it is possible to express the height h of the principal ray $l_1$ of the offaxial rays which enters the diverging front lens group 17 at the maximum field angle is expressed by the following formula (1).

$$h = \frac{\tan \omega}{\frac{1}{\frac{1}{\frac{1}{t_2} - \frac{1}{f_2}} + A - t_2} - \frac{1}{f_1}} \tag{1}$$

In the above formula (1), reference symbol $\omega$ represents the half field angle, reference symbol $f_1$ represents the focal length (negative value) of the diverging front lens group 17, reference symbol $f_2$ represents the focal length of the positive lens group 19, reference symbol A represents the distance from the diverging front lens group 17 to the stop surface 28 of the photographing optical system, and reference symbol $t_2$ represents the distance from the positive lens group 19 to the stop surface 28.

In case of the embodiment shown in FIG. 3, the second optical axis 24 directed from the aperture stop of the photographing optical system to the second rear lens group 25 reaches the center of the film cassette and, generally, the length of the film cassette is about 4.5 times of the image height C on the film surface. Therefore, the distance A and image height C should have the relation expressed by the following formula.

$$A \geq 2.25C$$

Besides, when the focal length of the photographing optical system is represented by a reference symbol f, the focal length f and image height C have the relation expressed by the following formula (2).

$$C = f \tan \omega \qquad (2)$$

To make the lens diameter of the diverging front lens group 17 small, it is preferable to arrange so that the relation expressed by the formula $h \leq C$ is satisfied. From this relation and formulas (1) and (2), the following formula (I) is obtained.

$$\frac{1}{f_1} \leq \frac{1}{\frac{1}{\frac{1}{t_2} - \frac{1}{f_2}} + A - t_2} - \frac{1}{f} \qquad (I)$$

That is, when it is so arranged that the above formula (I) is satisfied, it is possible to make the lens diameter of the diverging front lens group small.

Now, the condition for making the lens diameter of the converging rear lens group small is obtained as described below. To prevent the diameters of lenses on the image side of the positive lens group 19 from becoming large, it is necessary to arrange that paraxial rays will not diverge in the portion on the image side of the positive lens group 19. This can be attained when the following formula (II) is satisfied.

$$f_2 \leq A - t_2 - f_1 \qquad (II)$$

To make the lens diameter of the converging rear lens group still smaller, it is desirable to arrange that the height $H_F$ of the paraxial marginal ray $l_2$ which enters the positive lens group 19 will not exceed the image height C. This is due to the following reason. That is, when the refractive power of the diverging front lens group 17 is made stronger as shown by the formula (I), the height $H_F$ of the paraxial marginal ray $l_2$ becomes higher. Consequently, it is necessary to make the lens diameter larger and, moreover, the frames holding the respective lenses and light-splitting prism will interfere with each other. This will be prevented when the height of the observing ray is made small because the diameter of the observing light pencil on the stop surface 28 is larger than the diameter of the photographing light pencil on the stop surface 28. As the ratio k between the heights of rays in the observing optical system and photographing optical system is constant at positions just in front of the converging rear lens groups, the height $H_F$ of the paraxial marginal ray $l_2$ which enters the positive lens group 19 can be expressed by the following formula.

$$H_F = \frac{kf}{F} \left( 1 + \frac{A - t_2}{-f_1} \right)$$

In the above formula, reference symbol F represents the F-number of the photographing optical system. As the relation between $H_F$ and C is $H_F \leq C$, the following formula (III) is obtained from this relation and formula (2).

$$\frac{k}{F \tan \omega} \left( 1 + \frac{A - t_2}{-f_1} \right) \leq 1 \qquad (III)$$

When it is so arranged that the focal length of the positive lens group, etc. satisfy the above-mentioned formulas (II) and (III), the height of ray $l_2$ which enters the positive lens group 19 becomes the maximum and, therefore, diameters of lenses constituting the converging rear lens groups, which are arranged behind the positive lens group, become small. Besides, in the photographing optical system, the angle between the offaxial principal ray and second optical axis 24 is large as it is evident from FIG. 3, the second converging rear lens group becomes still smaller. Moreover, the end face of the image-transmitting optical fiber bundle 26 is generally smaller than the film surface, it is possible to make the first converging rear lens group small.

As explained hitherto, the present invention enables to make the overall diameter of optical system for endoscopes small. For an actual optical system, however, aberrations thereof should be corrected favourably. In case of the retrofocus-type optical system shown in FIG. 3, the diverging front lens group 17 refracts the offaxial lower ray (ray far from the optical axis) more strongly compared with the paraxial upper ray (ray near the optical axis). As a result, coma becomes asymmetrical. To correct spherical aberration and to prevent coma from occurring, in case of the embodiment shown in FIG. 3, the positive lens group 19 is arranged that the absolute value of the radius of curvature of its surface on the object side becomes smaller than the absolute value of the radius of curvature of its surface on the image side. Besides, the cemented doublets 21 and 25 are arranged in the converging rear lens groups so that asymmetry of coma is corrected more favourably and chromatic aberration is also corrected satisfactorily favourably. Moreover, the glass block 18 inserted between the diverging front lens group 17 and positive lens group 19 is effective for making the height of ray in the diverging front lens group small.

An example of numerical data of the embodiment shown in FIG. 3 is as shown below.

| | | | |
|---|---|---|---|
| $r_1 = \infty$ | | | |
| | $d_1 = 0.9$ | $n_1 = 1.58921$ | $\nu_1 = 41.08$ |
| $r_2 = 2.498$ | | | |
| | $d_2 = 0.95$ | | |
| $r_3 = \infty$ | | | |
| | $d_3 = 6.0$ | $n_2 = 1.883$ | $\nu_2 = 40.76$ |
| $r_4 = \infty$ | | | |
| | $d_4 = 0.55$ | | |
| $r_5 = 5.288$ | | | |
| | $d_5 = 1.2$ | $n_3 = 1.6968$ | $\nu_3 = 55.52$ |
| $r_6 = -11.914$ | | | |
| | $d_6 = 0.5$ | | |
| $r_7 = \infty$ | | | |
| | $d_7 = 1.1$ | $n_4 = 1.8061$ | $\nu_4 = 40.95$ |
| stop (28) | | | |
| | $d_8 = 1.1$ | $n_4 = 1.8061$ | $\nu_4 = 40.95$ |
| $r_8 = \infty$ | | | |
| | $d_9 = 1.6$ | | |
| $r_9 = 4.68$ | | | |
| | $d_{10} = 1.35$ | $n_5 = 1.618$ | $\nu_5 = 63.38$ |
| $r_{10} = -2.409$ | | | |
| | $d_{11} = 0.45$ | $n_6 = 1.834$ | $\nu_6 = 37.19$ |
| $r_{11} = \infty$ | | | |
| | $d_{12} = 1.1$ | $n_7 = 1.8061$ | $\nu_7 = 40.95$ |
| $r_{12} = \infty$ | | | |
| | $d_{13} = 0.8$ | | |
| $r_{13} = -12.698$ | | | |
| | $d_{14} = 0.75$ | $n_8 = 1.74$ | $\nu_8 = 28.29$ |
| $r_{14} = 1.799$ | | | |
| | $d_{15} = 1.35$ | $n_9 = 1.72916$ | $\nu_9 = 54.68$ |
| $r_{15} = -4.158$ | | | |
| | $d_{16} = 0.24$ | | |
| $r_{16} = 2.382$ | | | |
| | $d_{17} = 1.0$ | $n_{10} = 1.72916$ | $\nu_{10} = 54.68$ |
| $r_{17} = 3.428$ | | | |
| | $f = 3.915$ | $\omega = 35.8°$ | $F = 10$ |
| | $f_1 = -4.24$ | $t_2 = 1.613$ | $A = 6.523$ |
| | $f_2 = 5.411$ | $k = 1.65$ | $C = 2.82$ |

-continued $$\frac{1}{\frac{1}{\frac{1}{t_2} - \frac{1}{f_2}} + A - t_2} - \frac{1}{f} = -0.117$$

$$\frac{k}{F \tan \omega}\left(1 + \frac{A - t_2}{-f_1}\right) = 0.494$$

In the above example, reference symbols $r_1$ through $r_{17}$ respectively represent radii of curvature of respective surfaces of respective lenses and of the prism and glass block, reference symbols $d_1$ through $d_{17}$ respectively represent distances between respective surfaces, reference symbols $n_1$ through $n_{10}$ respectively represent refractive indices of respective lenses and of the prism and glass block, and reference symbols $\nu_1$ through $\nu_{10}$ respectively represent Abbe's numbers of respective lenses and of the prism and glass block.

In the embodiment explained hitherto, aperture stops are provided on the light-splitting surface 28 of the light-splitting prism 20. This arrangement enables to make the diameter of the aperture stop of the photographing optical system small and this is preferable for making the depth of focus on the film surface deep. In case of the optical system having lens configuration with which the stop of the photographing optical system is made small, it is preferable to arrange the aperture stop of the photographing optical system at a position in rear of the light-splitting surface. When, however, the distance from the diverging front lens group to the aperture stop in the photographing optical system is different from that distance in the observing optical system, the light is partially eclipsed and, consequently, the photographed field becomes different from the observed field. However, when the aperture stop of the observing optical system exists at a position between the positive lens group and the first converging rear lens group, the above-mentioned difference of field is small and it is not inconvenient for practical use. If the aperture stop of the photographing optical system comes to a position in front of the light-splitting surface, it becomes impossible to make the diameter of the aperture stop of the photographing optical system small and, consequently, the depth of focus cannot be made deep. Therefore, to simplify the composition of the optical system as a whole, it is effective when the aperture stop of the photographing optical system is arranged at the same position as the aperture stop of the observing optical system.

When, the aperture stop of the photographing optical system comes to a position in front of the positive lens group, the formulas (I), (II) and (III) cannot be applied as they are. If, however, it is supposed in the above case that the F-number is not changed, the formulas (II) and (III) related to the paraxial marginal ray do not change. Therefore, the formula (I) related to the offaxial ray can be applied when it is supposed as $f_2 = \infty$. When the aperture stops are not provided on the light-splitting surface, the light-splitting surface may be arranged as a semitransparent surface.

As explained hitherto based on the embodiment, the present invention provides a single-lens reflex optical system for endoscopes for which the outer diameter of the optical system as a whole is made small in spite of the fact that the distance between the diverging front lens group and converging rear lens group is made large and, therefore, the present invention enables to make the outer diameter of the distal end of the endoscope small.

We claim:

1. A single-lens reflex optical system for endoscopes comprising an observing optical system, a light-splitting means and a photographing optical system, said observing optical system comprising a diverging front lens group arranged on a first optical axis extending in parallel with the longitudinal direction of an endoscope and having negative refractive power, a positive lens group arranged on said first optical axis, a first converging rear lens group arranged on said first optical axis and having positive refractive power, and a first aperture stop arranged between said positive lens group and said first converging rear lens group and on said first optical axis, said light-splitting means being arranged between said positive lens group and said first converging rear lens group, said photographing optical system comprising said diverging front lens group, said positive lens group, a second converging rear lens group arranged on a second optical axis split by said light-splitting means and having positive refractive power, and a second aperture stop arranged between said positive lens group and said second converging rear lens group, said optical system satisfying the following conditions:

$$\frac{1}{f_1} \leq \frac{1}{\frac{1}{\frac{1}{t_2} - \frac{1}{f_2}} + A - t_2} - \frac{1}{f} \quad (I)$$

$$f_2 \leq A - t_2 - f_1 \quad (II)$$

$$\frac{k}{F \tan \omega}\left(1 + \frac{A - t_2}{-f_1}\right) \leq 1 \quad (III)$$

wherein reference symbol f represents the focal length of the photographing optical system, reference symbol $f_1$ represents the focal length of the diverging front lens group, reference symbol $f_2$ represents the focal length of the positive lens group, reference symbol A represents the distance between the diverging front lens group and the second aperture stop, reference symbol $t_2$ represents the distance between the positive lens group and the second aperture stop, reference symbol F represents the F-number of the photographing optical system, reference symbol $\omega$ represents a half field angle of the photographing optical system, and reference symbol k represents the ratio between the height of marginal ray in the photographing optical system at the front of the light-splitting means and the height of marginal ray in the observing optical system at the front of the light-splitting means.

2. A single-lens reflex optical system for endoscopes according to claim 1 further comprising a glass block arranged between said diverging front lens group and said positive lens group.

3. A single-lens reflex optical system for endoscopes according to claim 2 wherein said positive lens group comprises a biconvex lens of which the absolute value of the radius of curvature of the surface on the object side is smaller than the absolute value of the radius of curvature of the surface on the image side, and wherein said first converging rear group comprises a cemented doublet and said second converging rear lens group comprises a cemented doublet.

4. A single-lens reflex optical system for endoscopes according to claim 3, in which said single-lens reflex optical system for endoscopes has the following numerical data:

| | | | |
|---|---|---|---|
| $r_1 = \infty$ | | | |
| | $d_1 = 0.9$ | $n_1 = 1.58921$ | $\nu_1 = 41.08$ |
| $r_2 = 2.498$ | | | |
| | $d_2 = 0.95$ | | |
| $r_3 = \infty$ | | | |
| | $d_3 = 6.0$ | $n_2 = 1.883$ | $\nu_2 = 40.76$ |
| $r_4 = \infty$ | | | |
| | $d_4 = 0.55$ | | |
| $r_5 = 5.288$ | | | |
| | $d_5 = 1.2$ | $n_3 = 1.6968$ | $\nu_3 = 55.52$ |
| $r_6 = -11.914$ | | | |
| | $d_6 = 0.5$ | | |
| $r_7 = \infty$ | | | |
| | $d_7 = 1.1$ | $n_4 = 1.8061$ | $\nu_4 = 40.95$ |
| stop (28) | | | |
| | $d_8 = 1.1$ | $n_4 = 1.8061$ | $\nu_4 = 40.95$ |
| $r_8 = \infty$ | | | |
| | $d_9 = 1.6$ | | |
| $r_9 = 4.68$ | | | |
| | $d_{10} = 1.35$ | $n_5 = 1.618$ | $\nu_5 = 63.38$ |
| $r_{10} = -2.409$ | | | |
| | $d_{11} = 0.45$ | $n_6 = 1.834$ | $\nu_6 = 37.19$ |
| $r_{11} = \infty$ | | | |
| | $d_{12} = 1.1$ | $n_7 = 1.8061$ | $\nu_7 = 40.95$ |
| $r_{12} = \infty$ | | | |
| | $d_{13} = 0.8$ | | |
| $r_{13} = -12.698$ | | | |
| $r_{14} = 1.799$ | | | |
| | $d_{14} = 0.75$ | $n_8 = 1.74$ | $\nu_8 = 28.29$ |
| $r_{15} = -4.158$ | | | |
| | $d_{15} = 1.35$ | $n_9 = 1.72916$ | $\nu_9 = 54.68$ |
| $r_{16} = 2.382$ | | | |
| | $d_{16} = 0.24$ | | |
| $r_{17} = 3.428$ | | | |
| | $d_{17} = 1.0$ | $n_{10} = 1.72916$ | $\nu_{10} = 54.68$ |
| | $f = 3.915$ | $\omega = 35.8°$ | $F = 10$ |
| | $f_1 = -4.24$ | $t_2 = 1.613$ | $A = 6.523$ |
| | $f_2 = 5.411$ | $k = 1.65$ | $C = 2.82$ |

$$\frac{1}{\frac{1}{\frac{1}{t_2} - \frac{1}{f_2}} + A - t_2} - \frac{1}{f} = -0.117$$

$$\frac{k}{F \tan \omega}\left(1 + \frac{A - t_2}{-f_1}\right) = 0.494$$

wherein reference symbols $r_1$ through $r_{17}$ respectively represent radii of curvature of respective surfaces of respective lenses and of the prism and glass block, reference symbols $d_1$ through $d_{17}$ respectively represent distances between respective surfaces, reference symbols $n_1$ through $n_{10}$ respectively represent refractive indices of respective lenses and of the prism and glass block, and reference symbols $\nu_1$ through $\nu_{10}$ respectively represent Abbe's numbers of respective lenses and of the prism and glass block.

* * * * *